US009652990B2

(12) United States Patent
Rhee (10) Patent No.: US 9,652,990 B2
(45) Date of Patent: May 16, 2017

(54) SYSTEMS AND METHODS FOR MONITORING UNMANNED AERIAL VEHICLES (71) Applicant: DreamSpaceWorld Co., LTD., Daejeon (KR)

(72) Inventor: Sung Ho Rhee, Daejeon (KR)

(73) Assignee: DREAMSPACEWORLD CO., LTD., Daejeon (KR)

( * ) Notice: Subject to any disclaimer, the term of this patent is extended or adjusted under 35 U.S.C. 154(b) by 0 days.

(21) Appl. No.: 14/754,710

(22) Filed: Jun. 30, 2015

(65) Prior Publication Data

US 2017/0004714 A1 Jan. 5, 2017

(51) Int. Cl.

| G08B 21/00 | (2006.01) |
|---|---|
| G08G 5/00 | (2006.01) |
| G01C 21/26 | (2006.01) |
| G08B 5/22 | (2006.01) |
| G08B 3/10 | (2006.01) |
| G08B 6/00 | (2006.01) |
| G01C 23/00 | (2006.01) |
| G05D 1/00 | (2006.01) |
| G01S 19/13 | (2010.01) |

(52) U.S. Cl.
CPC ........... G08G 5/0082 (2013.01); G01C 21/26 (2013.01); G01C 23/00 (2013.01); G05D 1/0044 (2013.01); G08B 3/10 (2013.01); G08B 5/22 (2013.01); G08B 6/00 (2013.01); G01S 19/13 (2013.01)

(58) Field of Classification Search
CPC .......... G01S 19/19; G01S 19/14; G01S 19/35; G01S 19/49; G01S 19/26; G01S 19/34; G01S 19/39; G01S 19/40; G01S 19/42; G01S 19/13; G08G 5/0082; G01C 23/00
See application file for complete search history.

(56) References Cited

U.S. PATENT DOCUMENTS

| 6,084,510 A * | 7/2000 | Lemelson | G08B 15/004 340/539.13 |
|---|---|---|---|
| 6,868,314 B1 * | 3/2005 | Frink | B64C 1/00 244/119 |
| 7,734,254 B2 * | 6/2010 | Frost | A63H 30/04 244/189 |
| 8,744,737 B2 * | 6/2014 | D'Angelo | G08G 5/0008 701/120 |

(Continued)

FOREIGN PATENT DOCUMENTS

| KR | 10-2004-0096327 A | 11/2004 |
|---|---|---|
| KR | 10-2008-0014104 A | 2/2008 |
| KR | 10-2012-0125092 A | 11/2012 |

Primary Examiner — Joseph Feild
Assistant Examiner — Rufus Point
(74) Attorney, Agent, or Firm — Patent Office of Dr. Chung Park (57) ABSTRACT Embodiments of the present invention include devices and methods for monitoring a drone(s). The method includes: receiving information of a drone via a communication unit and displaying the information of the drone on a display panel of a device. The information includes the location of the drone and an icon indicating the location of the drone is displayed on a map rendered on the display panel. The method further includes determining, based on the information, whether the drone poses a danger and, responsive to the danger, issuing a warning of the danger.

17 Claims, 7 Drawing Sheets

(56) References Cited

U.S. PATENT DOCUMENTS

| | | | |
|---|---|---|---|
| 9,108,729 B2* | 8/2015 | Duggan | G05D 1/0061 |
| 9,269,239 B1* | 2/2016 | Jensen | G06K 9/00671 |
| 9,387,938 B1* | 7/2016 | Vanderkamp | B64D 45/00 |
| 9,389,084 B1* | 7/2016 | Chen | G01C 11/06 |
| 9,524,648 B1* | 12/2016 | Gopalakrishnan | G08G 5/0082 |
| 2007/0284474 A1* | 12/2007 | Olson | H04W 4/046 244/10 |
| 2008/0167763 A1* | 7/2008 | Duranti | G05D 1/105 701/11 |
| 2009/0073034 A1* | 3/2009 | Lin | G01S 19/49 342/357.32 |
| 2010/0001902 A1* | 1/2010 | Smith | G01S 5/0294 342/357.48 |
| 2010/0017114 A1* | 1/2010 | Tehan | G05D 1/0646 701/423 |
| 2010/0228468 A1* | 9/2010 | D'Angelo | G08G 5/0008 701/120 |
| 2012/0019522 A1* | 1/2012 | Lawrence | F41G 3/02 345/419 |
| 2012/0199698 A1* | 8/2012 | Thomasson | B64C 39/024 244/175 |
| 2014/0022051 A1* | 1/2014 | Levien | A61M 5/20 340/5.2 |
| 2014/0109113 A1* | 4/2014 | Stacy | G09B 9/08 719/318 |
| 2014/0324253 A1* | 10/2014 | Duggan | G05D 1/0061 701/3 |
| 2015/0168144 A1* | 6/2015 | Barton | G01C 11/02 348/144 |
| 2015/0204973 A1* | 7/2015 | Nohara | G01S 13/426 342/107 |
| 2015/0254988 A1* | 9/2015 | Wang | G05D 1/0214 701/3 |
| 2015/0316927 A1* | 11/2015 | Kim | G03B 15/006 701/2 |
| 2016/0116912 A1* | 4/2016 | Nehmadi | G05D 1/0022 701/2 |
| 2016/0117853 A1* | 4/2016 | Zhong | B64C 39/024 345/634 |
| 2016/0164619 A1* | 6/2016 | Sennett | H04H 20/08 455/404.1 |
| 2016/0165193 A1* | 6/2016 | Rasheed | G06K 9/3241 348/143 |
| 2016/0272317 A1* | 9/2016 | Cho | G08G 1/09 |
| 2016/0325835 A1* | 11/2016 | Abuelsaad | G08G 1/096716 |

* cited by examiner

SYSTEMS AND METHODS FOR MONITORING UNMANNED AERIAL VEHICLES

TECHNICAL FIELD

The present invention relates to enhancing safety from accidents associated with unmanned aerial vehicles, more particularly, to systems and methods for monitoring unmanned aerial vehicles.

DESCRIPTION OF THE RELATED ART

With the advent of technologies in the fields of electronics, robotics, and aeronautics, various types of unmanned aerial vehicles, which are referred to as drones hereinafter, have been developed. Drones come in wide varieties of sizes, shapes and functions, which may be controlled by either preprogrammed softwares or remote control systems from the ground. They are generally used to carry out tasks in which manned flight is considered to be risky. Drones mostly find use in military services, but are nowadays finding use in various civilian operations, such as search and rescue, weather analysis, recreation etc. Recently, helicopter drones equipped with cameras can provide clear ground images even from high altitudes.

The commercial and civil drones, such as surveillance drones may pose unique dangers. For example, as the drones get smaller and cheaper as well as more agile, the controllers may use their drones to carry weapons that can be lethal. The controllers may be able to carry the drones in their backpacks and assemble quickly as needed. In another example, even though the controller do not have any harmful intent during operation, the drones may fail to operate normally and/or out of control and crash into ground, causing injuries to person or damages to the property. As such, there is a need for systems and methods for monitoring the drones and providing preventive measures for dangers associated with the drones.

SUMMARY OF THE INVENTION

In one aspect of the present invention, a method for monitoring a drone includes: receiving information of a drone via a communication unit; displaying the information of the drone on a display of a device; and, responsive to detection of a danger posed by the drone, issuing a warning of the danger.

In another aspect of the present invention, a non-transitory computer readable medium carries one or more sequences of pattern data for monitoring a drone, where execution of the one or more sequences of pattern data by one or more processors causes the one or more processors to perform the steps of: receiving information of a drone via a communication unit; displaying the information of the drone on a display of a device; and, responsive to detection of a danger posed by the drone, issuing a warning of the danger.

In yet another aspect of the present invention, a device for monitoring a drone includes: a communication unit for receiving information of a drone; a display for displaying the information of the drone; one or more processors; and a non-transitory computer-readable medium comprising one or more sequences of instructions which, when executed by the one or more processors, causes steps to be performed comprising: responsive to detection of a danger posed by the drone, issuing a warning of the danger.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components may be implemented in software, hardware, or a combination thereof.

It shall also be noted that the terms "coupled" "connected" or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; (3) that certain steps may be performed in different orders; and (4) certain steps may be done concurrently.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Figure 1:
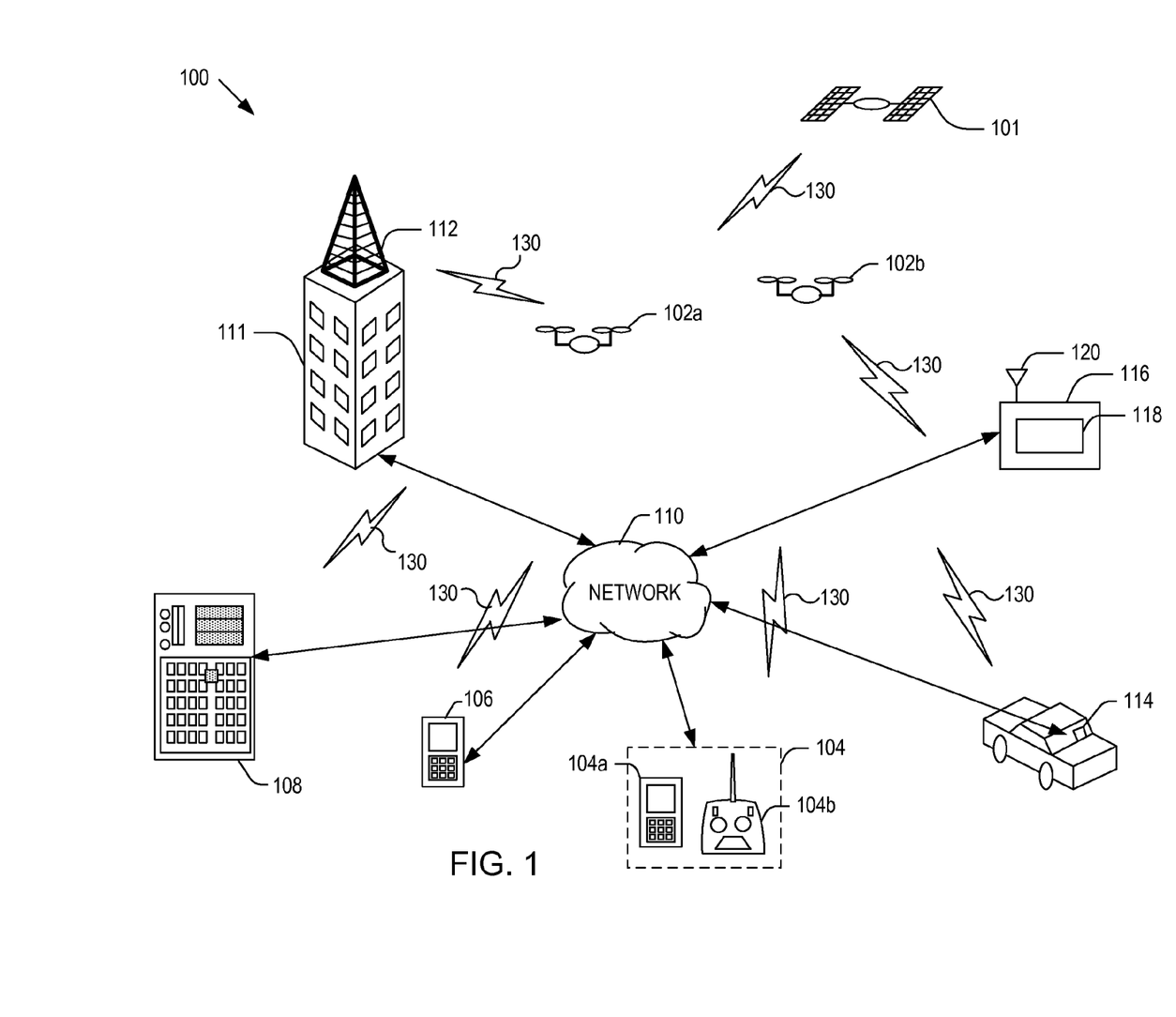
FIG. 1 shows a schematic diagram of an overall system for monitoring drones according to embodiments of the present invention.

FIG. 1 shows a schematic diagram of an overall system 100 for monitoring drones according to embodiments of the present invention. As depicted, the system 100 may include one or more drones 102 to be monitored by the system. In FIG. 1, only two helicopter drones 102a and 102b are shown. However, it should be apparent to those of ordinary skill in the art that any other suitable number and types of drones may be monitored by the system 100.

The flight paths of the drones 102a and 102b may be controlled by various methods. In some embodiments, a human controller manipulates a control device 104b to send control signals to a drone, e.g. 102a, in real time via a wireless communication(s). In other embodiments, a drone, e.g. 102b, may be programmed in advance to follow a preset flight path. For instance, the drone 102b has a computer system for storing information of the preset flight path and navigation system for following the preset flight path.

During operation, each drone, e.g. 102a, may receive signals from a satellite 101 and calculate/determine its flight information and broadcast the flight information to various devices 104, 106, 108, 112, 114, and 116 via wireless communications channels (or, shortly wireless communications) 130. It is noted that each wireless communication 130 may be a one-way communication channel or a two-way communication channel, i.e., each of the devices 104, 106, 108, 112, 114, and 116 may receive from and/or send signals to the drones directly. The wireless communication 130 may include, but not limited to, Wi-Fi, Zigbee, Bluetooth, G3, LTE, G2, VHF, UHF and AP. Also, these devices 104, 106, 108, 112, 114, and 116 may communicate the flight information to each other via a network 110.

In embodiments, the drone 102a may include a camera for capturing the ground images and send the images back to the control unit 104. In such a case, the control unit 104 may include a device 104a for displaying the ground images and/or the flight information received from the drone 102a.

The device 106 may be a mobile device, such as a cell phone, that has the capability to receive the signal sent by a drone(s), process the signal to extract information of the drone and display the information on the device. As discussed below, the device 106 may have various functions to monitor and detect abnormal behavior of the drones and to allow the user to take proper measures to avoid dangers from the drones. Since the mobile devices are commercially available to the public at large, the drones can be monitored by a large number of people simultaneously. Also, the people can communicate to each other to take preventive measures, enhancing the safety level from intentional or unintentional dangers associated with the drones.

The device 108 may be a computer for storing the signal, such as flight data and images, sent by the drones. Here, the term computer may be any suitable type of computing device that can process and store the signals from the drones. For instance, the device 108 may be a drone monitoring server and located in a law enforcement station. An officer may continuously monitor the flight information of drones and/or ground images sent by the drones. In embodiments, the device 108 directly receives the signals sent by the drones. In other embodiments, the device 108 receives the signals from other devices via the network 110, such as LAN, WAN, and Internet, where the network 110 includes wire communication and/or wireless communication methods. In embodiments, the server 108 includes one or more monitors for displaying the data and the images received from the drones.

The device 112 may be a wireless access point (AP) mounted on a building 111, where an AP refers to a device that allows wireless devices to connect to a wired network using Wi-Fi, or related standards. As the drone 102a proceeds further along its flight path, the building 111 may stand between the drone 102a and a device, e.g. 106, blocking the signal from the drone to the device. In such a case, one or more of the other devices 104, 108, 112, 114, and 116 may provide the signal from the drone 102a to the device 106 through the network 110.

The device 114 is installed in an automobile. In embodiments, the device 114 receives and processes the signals from the drones and provides the information of the drone to the driver on a display panel. In some embodiments, the device 114 may have a standalone display panel. In other embodiments, the device 114 may use the conventional navigation panel to display the information of the drones.

The device 116 may be any other suitable equipment that has a communication device 120 for receiving the signals from the drones and a display panel 118 for displaying the information of the drones to the user. By way of example, the device 116 may include Internet-of-Things (IoT), where IoT refer to physical objects that feature an IP address for internet connectivity, and the communication that occurs between these objects and other Internet-enabled devices and systems. The device 116 may extend internet connectivity beyond traditional devices like desktop and laptop computers, smartphones and tablets to a diverse range of devices and everyday things that utilize embedded technology to communicate and interact with the external environment.

In embodiments, each of the devices 104a, 106, 108, 114, and 116 stores the signals received from the drones for a preset time interval. In embodiments, the device 108 has large data storage for storing the signals received from the drones for longer period of time. In embodiments, the device 108 receives all of the signals from the drones, processes the received signals and transmits the processes signals to the other devices. For instance, the device 108 extracts the location information of the drones from the signals received from the drones and transmits the location information to the other devices so that the other devices display the drones on their display panels. In embodiments, the device 108 sends warning signs to the people near an estimated crash site so that they can evacuate from the site before the crash.

Figure 2A:
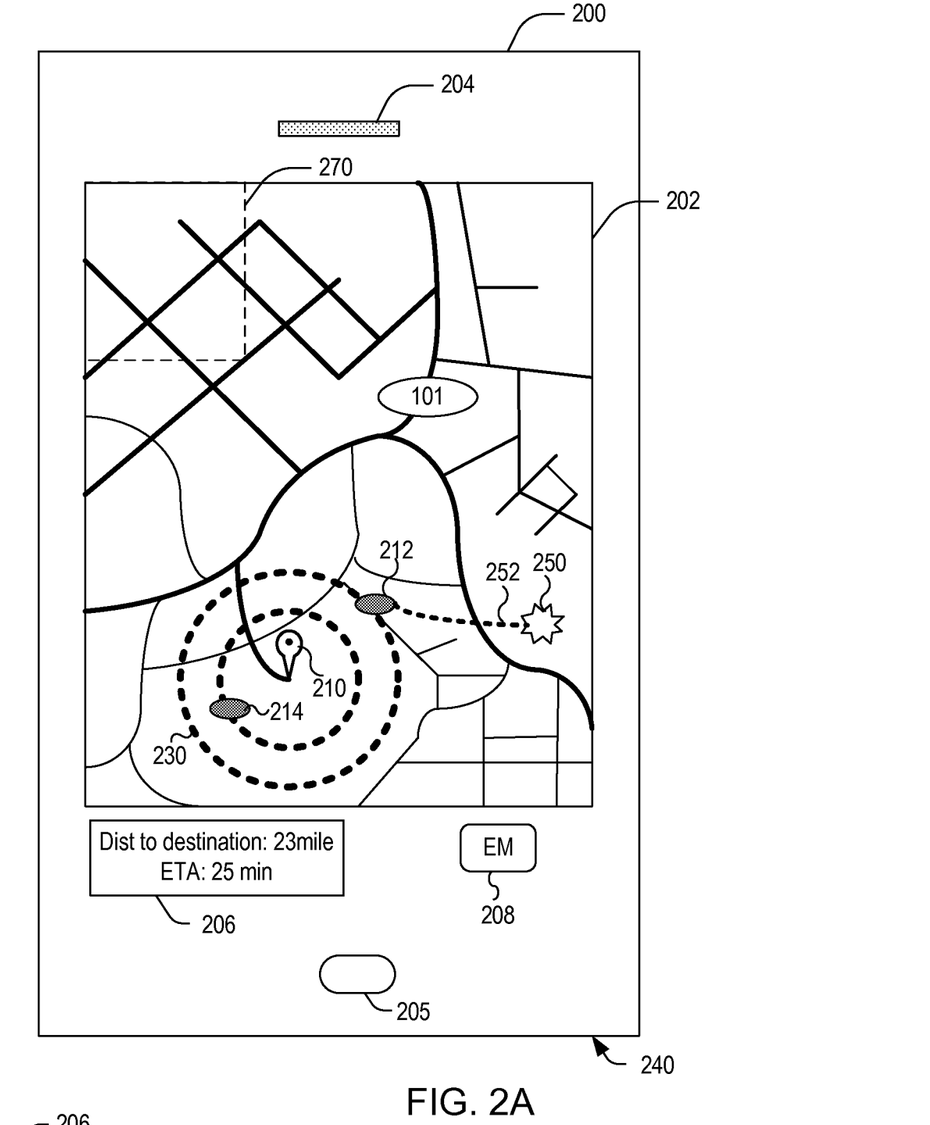
FIG. 2A shows a device for monitoring and displaying drones on a map according to embodiments of the present invention.

FIG. 2A shows a device 200 for monitoring and displaying drones on a map according to embodiments of the present invention. The device 200 may be one of the devices 104a, 106, 108, 114, and 116. As depicted, the device 200 may include a display panel (or, shortly display) 202 for displaying a map, an icon 210 indicating the current location of the device 200, circles 230 indicating zones having different danger levels, and one or more icons 212 and 214 indicating the locations of drones. It is noted that the display 202 shows the locations of the drones on a two-dimensional map. However, it should be apparent to those of ordinary skill in the art that the icons 212 and 214 may be displayed in a three-dimensional view so that the x,y,z coordinates of the drones are displayed if the display 202 is capable of rendering objects in a three-dimensional space.

In embodiments, the display 202 may display the images received from the drones. For example, the images are displayed in real time on the entire portion of the display 202. In another example, the images are displayed in real time on a portion 270 of the display 202 in place of the map. It should be apparent to those of ordinary skill in the art that the display 202 may have various designs to show the map, icons and the images.

The device 200 may also include an input device (such as push button) 205 that allows the user to control the device 200. For instance, the device 200 may be a mobile phone and the user may push the input device 205 to enter different operational mode of the device 200.

Figure 2B:
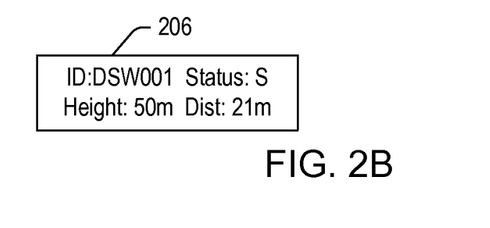
FIG. 2B shows an exemplary message displayed on the device of FIG. 2A according to embodiments of the present invention.

The device 200 may use its GPS equipment installed therein and display the estimated time and distance to the destination in a text field 206. In embodiments, the test field 206 may be used to display information related to a drone. FIG. 2B shows an exemplary message displayed in the text field 206 according to embodiments of the present invention. In embodiments, when the user touches one of the icons, e.g. 212, the contents of the text field 206 displays the identity and flight information of the corresponding drone, as depicted in FIG. 2B. As depicted, the information may include identification of the drone, altitude, and/or current operational status. It should be apparent to those of ordinary skill in the art that other information of the drone may be displayed in the text field 206.

The device 200 may include an emergency button 208, which can be a GUI button, for instance. When the user detects a danger, the user may touch the emergency button 208 to dispatch a warning signal. In embodiments, the device 200 may call an emergency unit so that the user may report the emergency via a microphone 240 located on a side of the device 200. In embodiments, the device 200 may send a warning signal to the computer 108 so that a proper step may be taken in respond to the emergency.

In embodiments, when the user finds a drone by his naked eyes while the device 200 does not show an icon of the drone on the display 202, the user may touch the button 208, notifying a proper authority of the unidentified drone.

The device 200 may render additional information on the display 202. For instance, when the device 200 analyzes the flight data sent by the drone 212 and determines that the drone 212 has an abnormal flight and is likely to crash, the device 200 calculates the estimated crash site 250 and the trajectory 252 and displays them on the display 202. Also, it can show in the text field 206 whether the drone is crashing toward or away from the device. Also, the device 200 sends warning signs to other devices in FIG. 1 so that the people nearby the crash site 250 are evacuated before the crash.

In embodiments, the device 200 may include software that displays the circles 230, icons 212 and 214, text field 206 in FIG. 2B, and the GUI button 208 on the device 200. For instance, the device 200 is a mobile phone that has the capability to render the map and icon 210 on the display 202. By downloading and installing the software in the device 200, the user can monitor the drones, i.e., the device 200 can operate as a drone monitoring device. Since any person other than the drone controller can monitor the drones, the dangers associated with the drones can be detected by several people and reported/responded in a more efficient manner than a case where only the drone controller can report the emergency.

It is noted that the speaker 204 and the microphone 240 may be disposed in any other locations of the device 200. Also, they may have other configurations, depending on the type of the device 200. For instance, the device 200 may be the computer 108, and the speaker and microphones may be coupled to the device by wires. Likewise, the device 200 may have other GUI design than the display 202 and input devices without deviating from the spirit of the present invention.

In embodiments, the device 104a is combined with the controller device 104b to form an integral body, i.e., the control device 104b has the capability to display the images shown in FIGS. 2A-2B.

The device 200 may have various functions. In embodiments, when the user double clicks the icon 214 twice, the detailed information of the drone corresponding to the icon 214 is shown on the text field 206, where the detailed information includes the identification of the drone and the contact information of the owner so that the user can communicate to the owner. In embodiments, the detailed information includes the ground images sent by the drone, i.e., the display 202 shows ground images in the box 270.

Figure 3:
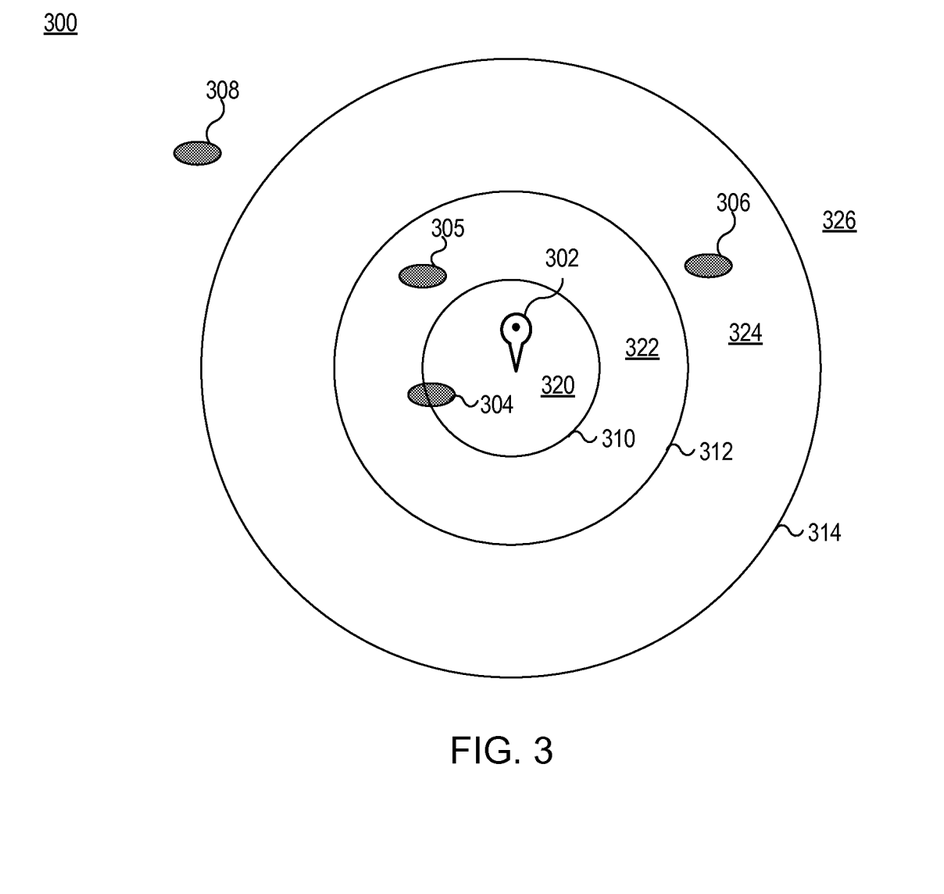
FIG. 3 shows an image of zones having multiple danger levels according to embodiments of the present invention.

FIG. 3 shows an image 300 of zones having multiple danger levels according to embodiments of the present invention. The circles 310, 312, and 314, which are centered at the current location 302 of the device 200 and displayed on the display 202, represent the boundaries of the zones 320, 322, 324, and 326 having different danger levels. The radii of the circles 310, 312, and 314 may be set to any suitable values and a drone in each zone is displayed in a preset color. For instance, the radius of the circle 302 is 10 meters and the zone 320 within the circle 302 is classified as "danger" and icon 304 is in red. Likewise, the zones 322, 324, and 326 are classified as "warning," "caution," and "attention." Using the signal received from each drone, the device 200 calculates the distance between the drone and the device, and determines which zone the drone is located in.

Depending on the danger level, the device 200 may take different approaches to inform the user of potential danger. For example, when a drone 308 gets close to the circle 314, the device 200 starts pay attention to the drone. In another example, when a drone 306 enters the zone 324, the device 200 may render a text message on the display 202. In yet another example, when a drone 305 enters the zone 322, the device 200 may give a verbal warning message to the user. In still another example, when a drone 304 enters the zone 320, the device 200 may issue an alarm sound, mechanical vibration, and/or render flashing signs on the display 202. It should be apparent to those of ordinary skill in the art that other suitable warning signals can be given to the user when drones enter different zones.

Figure 4A:
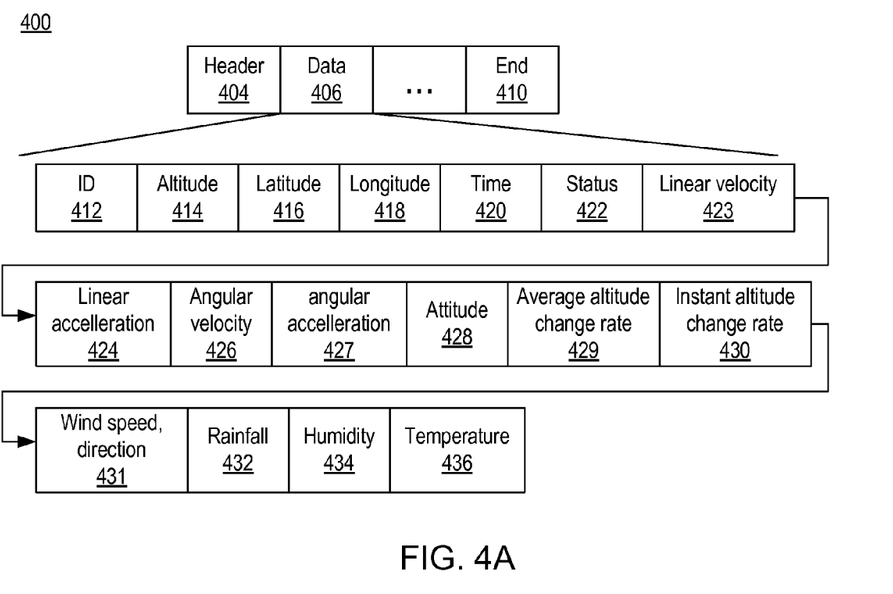
FIG. 4A shows a schematic diagram of a communication protocol according to embodiments of the present invention.

As discussed in conjunction with FIG. 1, a drone broadcasts its flight information to various devices through the wireless communications 130. FIG. 4A shows a schematic diagram 400 of a communication protocol according to embodiments of the present invention. As depicted, the protocol includes a header 404, data 406 and an end portion 410. It should be apparent to those of ordinary skill in the art that the protocol 400 may have other suitable format.

The data 406 may include the identification (ID) 412 of the broadcasting drone and the flight information, where the flight information may include one or more of altitude 414 of the drone, latitude 416 of the drone, longitude 418 of the drone, time 420 when the data 400 is broadcasted, status 422 of the drone, linear velocity 423 of the drone, linear acceleration 424 of the drone, angular velocity 426 of the drone, angular acceleration 427 of the drone, attitude 428 of the drone, average altitude change rate 429 of the drone during a preset time interval and instant altitude change rate 430. The data 406 may also include various quantities (or, equivalently, flight condition) measure by sensors of the drone, such as wind speed and direction 431, rainfall 432, humidity 434, and temperature 436. It should be noted that the data may include one or more of the information 412-436, depending on the types of sensors installed in the drone.

The ID 412 is a unique number assigned by a suitable organization to each drone. The status 422 of the drone represents the operational status of the drone. In embodiments, the status 422 may include (1) normal flight mode and (2) failure mode, where the failure mode may include, but not limited to, (1) out of control, (2) crashing, (3) internal measurement unit (IMU) failure, (4) control system failure, (5) driving system failure, (6) global positing system (GPS) failure, (7) communication system failure, (8) unable to fly due to strong wind, and (9) unable to fly due to heavy rain.

The device 200 parses the data 406 and display information of the drone on the display 202 as discussed in conjunction with FIGS. 2A-3. Also, using the status information 422, the device 200 can determine whether the drone is under normal condition or not. Also, if the drone is having an abnormal flight, the device 200 can analyze the source of the abnormal flight so that the user can take proper steps to in response to the abnormal flight.

Figure 4B:
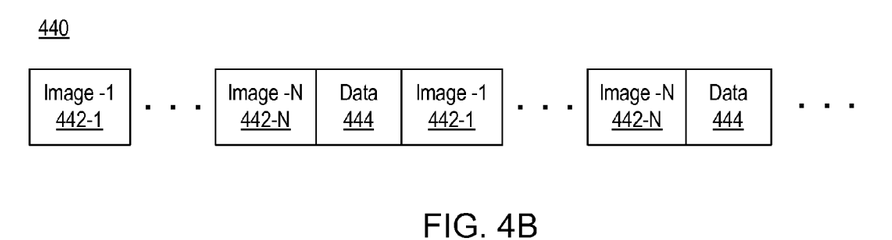
FIG. 4B shows a schematic diagram of a communication protocol according to embodiments of the present invention.

As discussed above, the drone may have a camera to capture images and send the captured images back to the control unit 104 and/or any other device in FIG. 1 that has the capability to receive the images. FIG. 4B shows a schematic diagram of a communication protocol 440 according to embodiments of the present invention flight information. As depicted, protocol 440 may include a sequence of images 442-1-442-N and data 444, where the data 444 may include one or more components of the data 406 shown in FIG. 4A.

Figure 5:
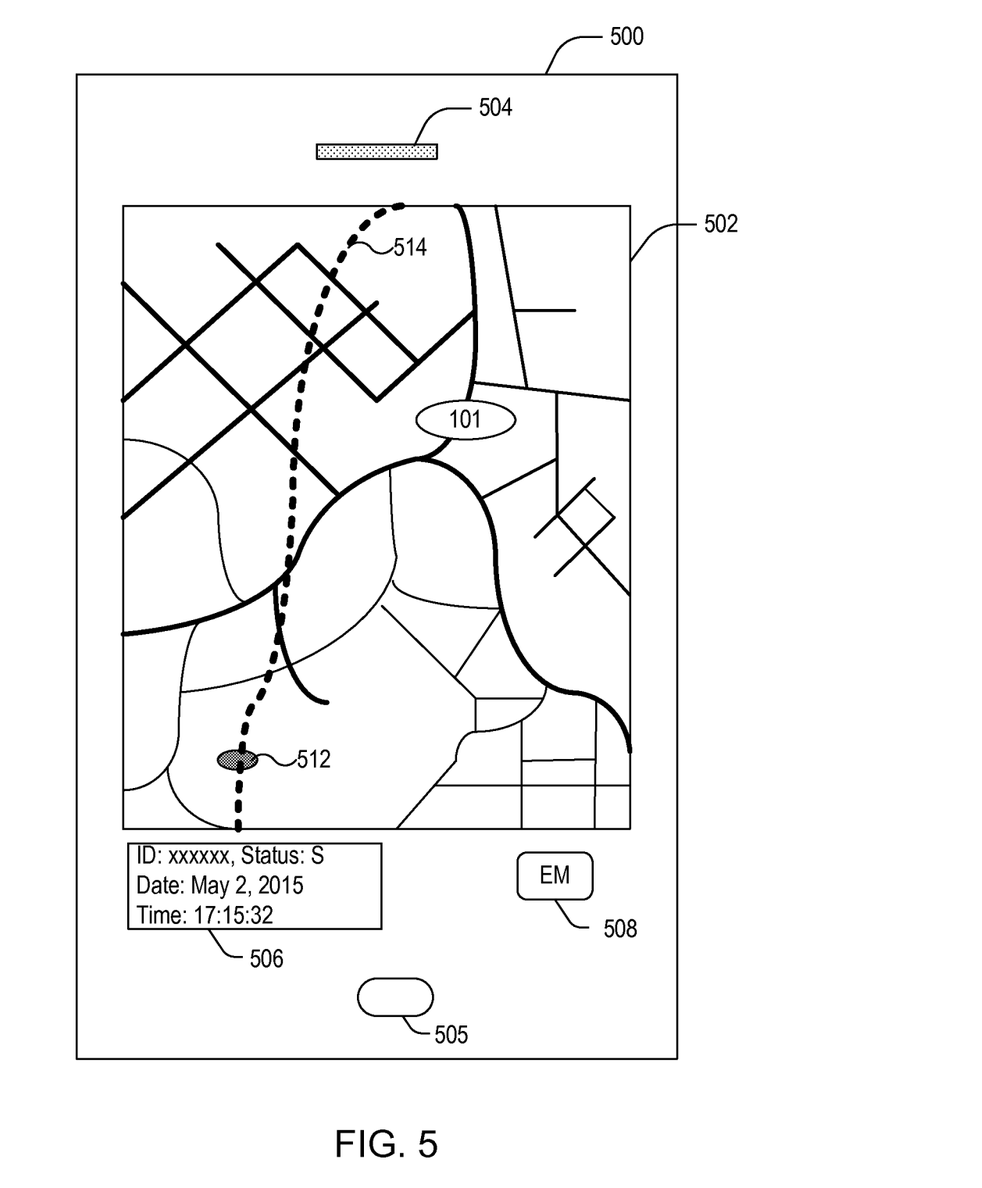
FIG. 5 shows an exemplary image displayed on a device according to embodiments of the present invention.

FIG. 5 shows an exemplary image displayed on a device 500 according to embodiments of the present invention. As depicted, the device 500 may be similar to the device 200 in FIG. 2A. The device 500 includes a display 502, speaker 504, emergency button 508, and input device 505. The device 500 has data storage therein for storing the data 400 (and/or 440) and is able to replay the data on the display 502. In embodiments, the user manipulates the input button 505 and other menu GUI buttons (not shown in FIG. 5) to bring up the display 502 on the device 500. Also, the user operates the device 500 so that the device 500 replays the flight trajectory 514 of the drone 512 and displays the flight information on the text field 506 as the drone 521 moves along the flight trajectory 514. Upon reviewing the flight information along the trajectory 514, the user may determine the behavior of the drone, i.e. the device 500 may be operated as the black box of an airplane.

Figure 6:
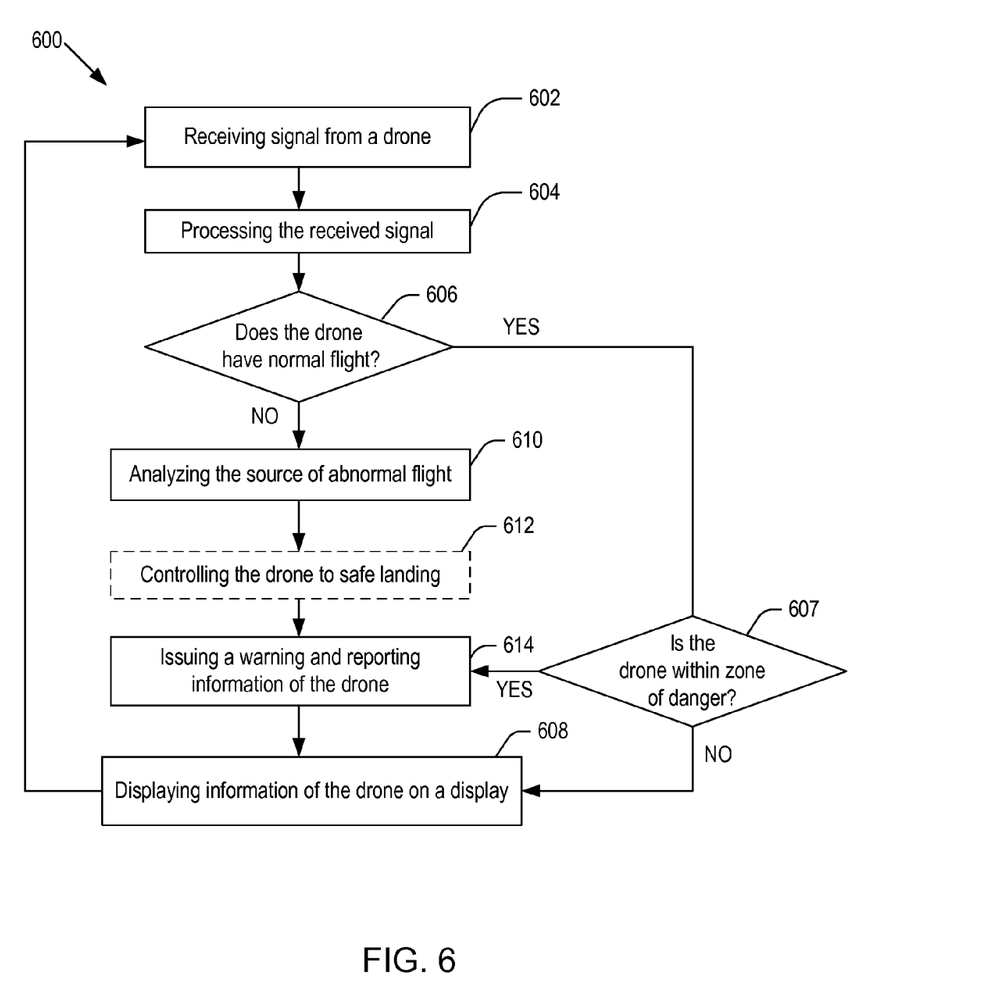
FIG. 6 shows a flowchart of an illustrative process for monitoring drones according to embodiments of the present invention.

FIG. 6 shows a flowchart 600 of an illustrative process for monitoring drones according to embodiments of the present invention. The process starts at step 602. At step 602, the device 200 receives a signal from a drone, where the signal may be formatted according a communication protocol, such as 400 or 440. Then, at step 604, the device processes the received signal. In embodiments, the signal is stored in the data storage of the device. In embodiments, the signal is transmitted to other devices in FIG. 1 through the network 110 or other suitable wireless communication channels. In embodiments, the device parses the signal to extract information of the drone.

At step 606, the device determines whether the drone is under normal operation, i.e., drone has a normal flight. In some embodiments, the device may use the status information 422 extracted at step 604 to determine whether the drone is under normal operation. In other embodiments, the device 200 may analyze the flight path of the drone and compare the flight path to preset criteria. For instance, when the drone is flying at a speed higher than a preset threshold toward a target, the device determines that the drone is flying under abnormal condition. As such, at step 606, the device determines whether the drone poses any threat or danger, either intentional or unintentional. The unintentional danger includes, for instance, failure of a component of the drone and harsh weather condition.

If the determination at step 606 is positive, the process proceeds to step 607. At step 607, it is determined whether the drone is within a zone of danger. If the drone is within the zone of danger (as discussed in conjunction with FIG. 3), the device 200 issues a warning signal, such as verbal, visual, and mechanical (vibration) warning signal at step 614. In embodiments, the device 200 may report the information of the drone to other devices in FIG. 1. For instance, the device 200 may send a notice to other devices through various communication channels so that the users of other devices are notified of the danger associated with the drone. As such, at step 607, the device 200 again checks whether the drone poses any threat or danger.

At step 608, the information of the drone is rendered on a display 202. In embodiments, as discussed in conjunction with FIGS. 2A-3, the drone may be displayed in different colors depending on the type of zone where the drone is located. In embodiments, the flight data of the drone may be displayed in the text field 206. In embodiments, the device 200 may display the images in real time sent by the drone. Upon negative answer to step 607, the process proceeds to step 608.

If the determination at step 606 is negative, the process proceeds to step 610. At step 610, the device 200 analyzes the source of the abnormal flight. The source may be due to the failure of one or more components of the drone or unexpected harsh weather, or the controller of the drone has intent to inflict injury to a person or property. Optionally, at step 612, if the user of the device is also a controller of the device, the user controls the drone to a safe landing so that injury to a person or property is prevented. Next, at step 614, the device 200 may issue a proper warning signal to the user at step 612. In embodiments, if the device 600 determines that the drone is about to crash or poses a threat to a person or property, the device may give one or more of a visual signal, a vibration signal, and a verbal signal as warning signal to the user. In embodiments, the visual signal includes a flashing signal on the display 202 and/or flashing icon of the drone.

In addition, at step 614, the device 200 may report the information of the drone to other devices in FIG. 1. For instance, the device 200 may send a notice to other devices through various communication channels so that the users of other devices are notified of the danger associated with the drone. Then, the process proceeds to step 608. At step 608, the device 200 may display the information of the drone, especially the information associated with the source of abnormal flight on the display 202 (or 502). In embodiments, additional information, such as estimated crash site 250, is displayed on the display. Then, the process proceeds to step 602 and repeats the steps in the flowchart 600.

Figure 7:
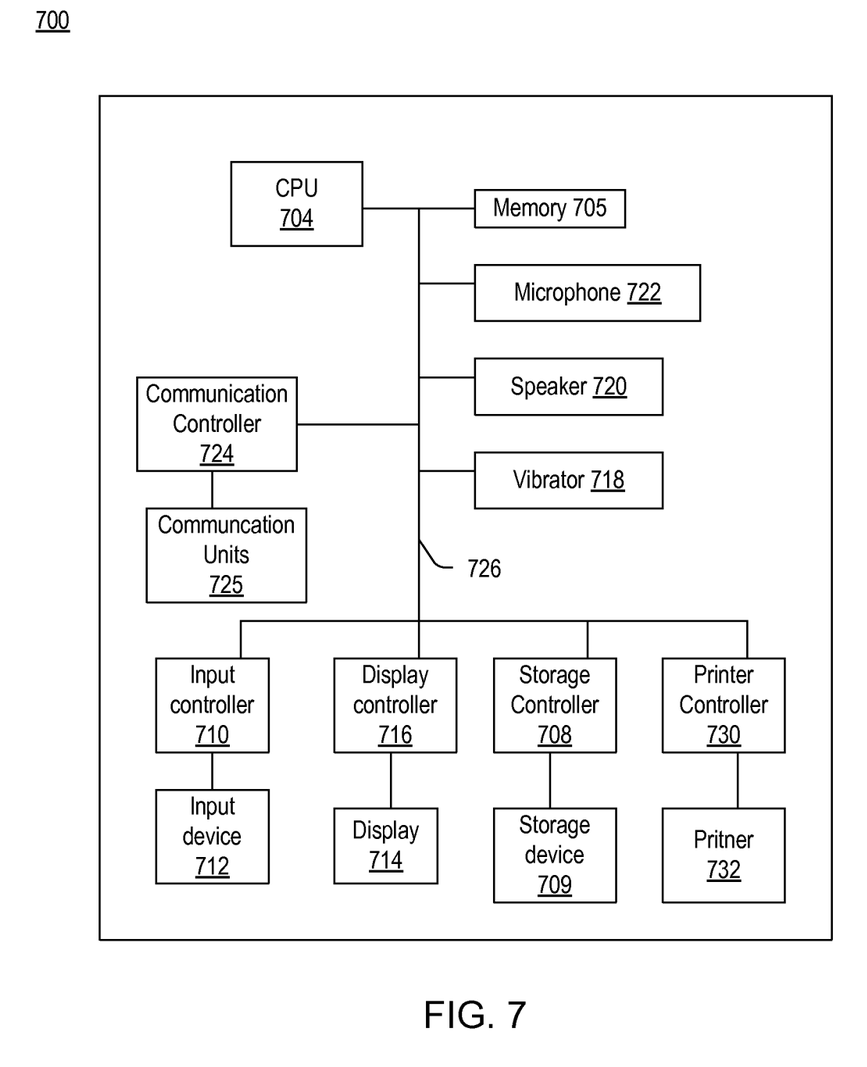
FIG. 7 shows a schematic diagram of a device for implementing one or more aspects of the present invention.

FIG. 7 shows a schematic diagram of a device 700 for implementing one or more aspects of the present invention. The device 200 may include one or more components in the device 700. As illustrated in FIG. 7, device 700 includes a central processing unit (CPU) 704 that provides computing resources and controls the components of the device to perform various steps of the flowchart 600. CPU 704 may be implemented with a microprocessor or the like, and may also include a graphics processor and/or a floating point coprocessor for mathematical computations. The device 700 may also include a system memory 705, which may be in the form of random-access memory (RAM) and read-only memory (ROM).

A number of controllers and components may also be provided, as shown in FIG. 7. An input controller 710 represents an interface to various input device(s) 712, such as a keyboard, mouse, stylus, or the push button 205 (505). The device 700 may also include a storage controller 708 for interfacing with one or more storage devices (or, equivalently, data storage) 709 each of which includes a storage medium such as solid state storage, magnetic tape or disk, or an optical medium that might be used to record programs of instructions for operating systems, flight data, images from the drones, utilities and applications which may include embodiments of programs that implement various aspects of the present invention. The storage device(s) 709 may also be used to store processed data or data to be processed in accordance with the invention.

The device 700 may also include a display controller 716 for providing an interface to a display device 714 (such as 202 and 502), which may be a cathode ray tube (CRT), a thin film transistor (TFT) display, or other type of display. The device 700 may also include a printer controller 730 for communicating with a printer 732. A communications controller 724 may interface with one or more communication units 725, which enables the device 700 to connect to remote devices through any of a variety of networks including the wireless communications 130 and the network 110, the Internet, an Ethernet cloud, an FCoE/DCB cloud, a local area network (LAN), a wide area network (WAN), a storage area network (SAN) or through any suitable electromagnetic carrier signals including RF and infrared signals.

The device 700 may also include a vibrator 718 and a speaker 720 for providing suitable signals to the user. In embodiments, when the drone enters a warning zone or is about to crash due to system failure, the vibrator 718 and/or the speaker 720 may give a vibration and/or verbal warning signal to the user so that the user can take proper actions for the danger. In embodiments, the device 700 may give a warning signal if an unidentified drone enters a preset zone. In embodiments, the device 700 may analyze the flight data, determine whether the drone has an abnormal flight, such as unusually high speed toward a target, and give a proper warning signal to the user by use of the vibrator 718 and the speaker 720. The device 700 includes a microphone 722 for converting the sound into electrical signal and communicating to the processor unit 704 so that the user can communicate to remote devices.

In the illustrated system, all major system components may connect to a bus 726, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

In embodiments, the user of a device 700 may install software in the device so that the device 700 has the features in FIGS. 2-6. For instance, the device 700 is a mobile phone and the user may install the software in the mobile device to monitor the drones. Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for monitoring a drone by use of a mobile device:
   receiving information of a drone via a communication unit of a mobile device on a ground directly from the drone, the information including a location of the drone;
   displaying the information of the drone on a display of the mobile device;
   based on a distance between the drone and the mobile device, detecting a danger posed by the drone to the mobile device; and
   responsive to detection of the danger, issuing a warning of the danger,
   wherein the step of displaying information of the drone includes:
   rendering a map on the display; and
   displaying a first icon indicating the location of the drone and a second icon indicating a location of the mobile device on the map.

2. A method as recited in claim 1, wherein the step of displaying information of the drone includes:
   determining a zone on the map; and
   displaying the first icon in a preset color when the drone is located in the zone.

3. A method as recited in claim 1, further comprising:
   determining an estimated trajectory and a crash site of the drone; and
   displaying the estimated trajectory and crash site on the map.

4. A method as recited in claim 1, wherein the warning includes at least one of visual, verbal and mechanical warning signs.

5. A method as recited in claim 1, further comprising:
   storing a trajectory of the drone in a data storage of the mobile device; and
   replaying the trajectory of the drone using the stored information on the map.

6. A method as recited in claim 1, wherein the information is contained in a signal broadcasted by the drone and includes status information of the drone, further comprising:
   determining whether the drone poses the danger based on the status information.

7. A method as recited in claim 1, wherein the information is contained in a signal broadcasted by the drone and includes at least one of identification, flight data, flight condition measured by the drone and images captured by the drone.

8. A non-transitory computer readable medium carrying one or more sequences of pattern data for monitoring a drone by use of a mobile device on a ground, where execution of the one or more sequences of pattern data by one or more processors causes the one or more processors to perform the steps of:
   receiving information of the drone via a communication unit of the mobile device directly from the drone, the information including a location of the drone;
   displaying the information of the drone on a display of the mobile device;
   based on a distance between the drone and the mobile device, detecting a danger posed by the drone to the mobile device; and
   responsive to detection of the danger, issuing a warning of the danger,
   wherein the step of displaying information of the drone includes:
   rendering a map on the display; and
   displaying a first icon indicating the location of the drone and a second icon indicating a location of the mobile device on the map.

9. A non-transitory computer readable medium as recited in claim 8, wherein the step of displaying information of the drone includes:
   determining a zone on the map; and
   displaying the first icon in a preset color when the drone is located in the zone.

10. A non-transitory computer readable medium as recited in claim 8, wherein the execution of the one or more sequences of pattern data by one or more processors causes the one or more processors to perform the additional steps of:
    determining an estimated trajectory and a crash site of the drone; and
    displaying the estimated trajectory and crash site on the map.

11. A non-transitory computer readable medium as recited in claim 8, wherein the warning includes at least one of visual, verbal and mechanical warning signs.

12. A non-transitory computer readable medium as recited in claim 8, wherein the execution of one or more sequences of pattern data by one or more processors causes the one or more processors to perform the additional steps of:
    storing a trajectory of the drone in a data storage of the mobile device; and
    replaying the trajectory of the drone using the stored information on the map.

13. A mobile device on a ground for monitoring a drone, comprising:
    a communication unit for receiving information of a drone directly from the drone, the information including a location of the drone;
    a display for displaying the information of the drone;
    one or more processors; and
    a non-transitory computer-readable medium comprising one or more sequences of instructions which, when executed by the one or more processors, causes steps to be performed comprising:
    rendering a map on the display;
    displaying a first icon indicating the location of the drone and a second icon indicating a location of the mobile device on the map; and
    responsive to detection of a danger posed by the drone to the mobile device, issuing a warning of the danger, the detection of the danger being based on a distance between the drone and the mobile device.

14. A mobile device as recited in claim 13, wherein the display is configured to display a zone on the map and the first icon in a preset color when the drone is located in the zone.

15. A mobile device as recited in claim 13, wherein the steps further comprise:
    determining an estimated trajectory and a crash site of the drone; and
    displaying the estimated trajectory and crash site on the map.

16. A mobile device as recited in claim 13, further comprising: a data storage for storing a trajectory of the drone, wherein the mobile device is configured to replay the trajectory using the stored trajectory on the map.

17. A mobile device as recited in claim 13, further comprising: at least one of a speaker and a vibrator for providing the warning sign.

\* \* \* \* \*